United States Patent
Deli et al.

[15] 3,645,350
[45] Feb. 29, 1972

[54] FRAME WITH DOUBLE WALLS FOR CRAWLER TRACTOR

[72] Inventors: Jack M. Deli, Wheaton; Frank J. Kowalczyk, Lincolnwood; Ronald J. Fanslow, Lexington Field; Marino J. Pisani, North Riverside, all of Ill.

[73] Assignee: International Harvester Company, Chicago, Ill.

[22] Filed: Jan. 30, 1970

[21] Appl. No.: 8,200

[52] U.S. Cl. .......................... 180/9.2 R, 180/9.62, 180/68 R, 180/69.1, 280/106 R
[51] Int. Cl. ............................................. B62d 55/00
[58] Field of Search ...................... 180/9.2, 9.62, 54 D, 68 R, 180/9.5, 9.54, 69.1; 280/106

[56] References Cited

UNITED STATES PATENTS

| 1,213,848 | 1/1917 | Edgington | 180/69.1 |
| 1,304,416 | 5/1919 | Turnbull | 180/9.62 |
| 1,932,108 | 10/1933 | Johnston | 180/6.7 |
| 2,363,052 | 11/1944 | Eberhard | 180/6.7 |
| 2,869,659 | 1/1959 | Mayo | 180/9.2 UX |
| 3,085,643 | 4/1963 | Schwartz | 180/6.7 X |

*Primary Examiner*—Richard J. Johnson
*Attorney*—Floyd B. Harman

[57] ABSTRACT

Integrated tractor frame of double-wall construction. Each of two sides of the front section of the tractor frame comprises two spaced parallel walls secured to one another by top and bottom strips and having upwardly extending front portions for mounting a radiator for the tractor. Each of two sides of the rear section of the tractor frame is formed of a double-wall casting provided with an elephant ear at which is located the driving connections between the steering drive mechanism within the rear section of the tractor frame and the sprocket for driving a loop of track links.

15 Claims, 19 Drawing Figures

Inventors
Jack M. Deli
Frank J. Kowalczyk
Ronald J. Fanslow
Marino J. Pisani
By John W. Harner
Atty.

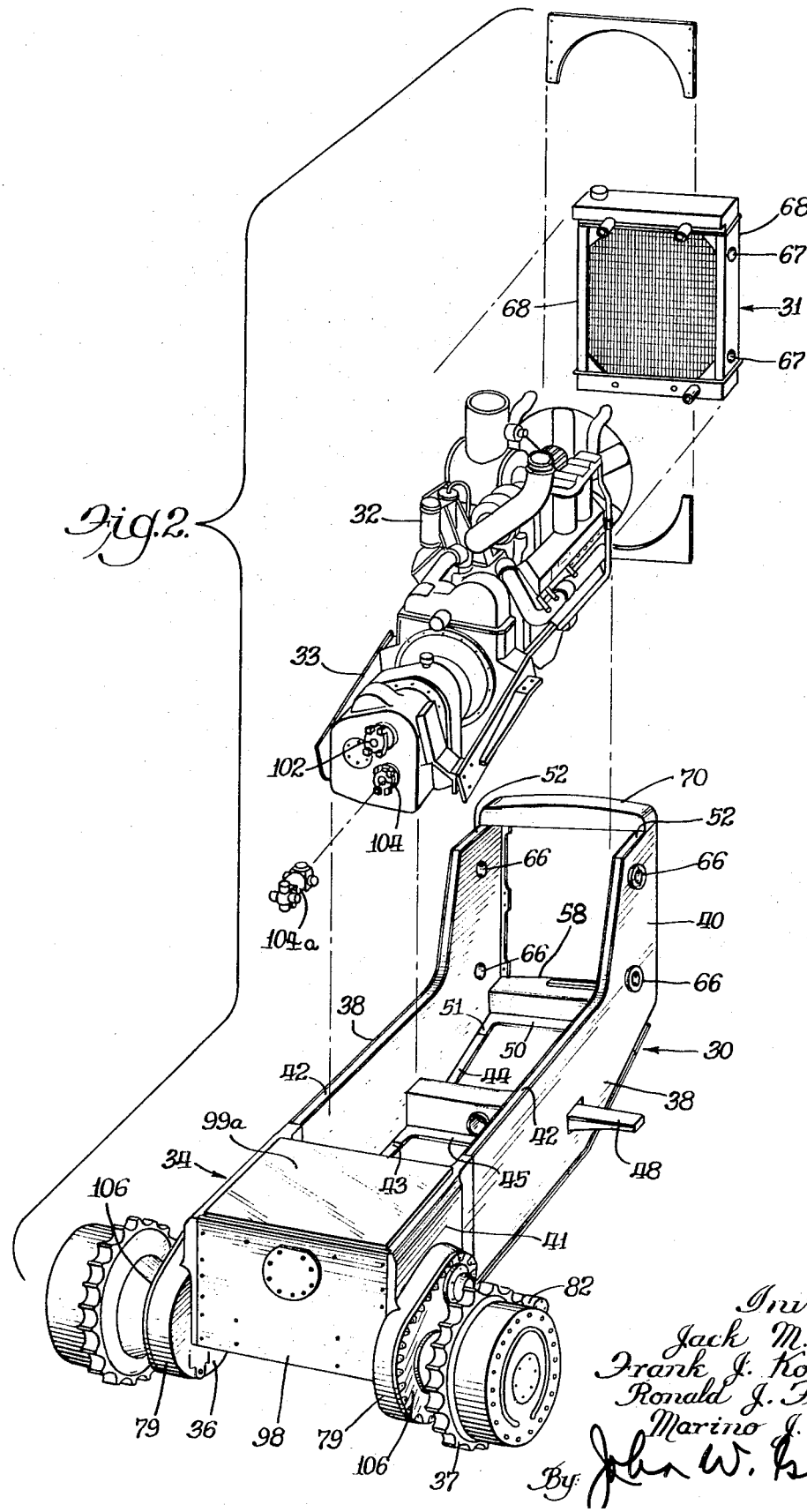

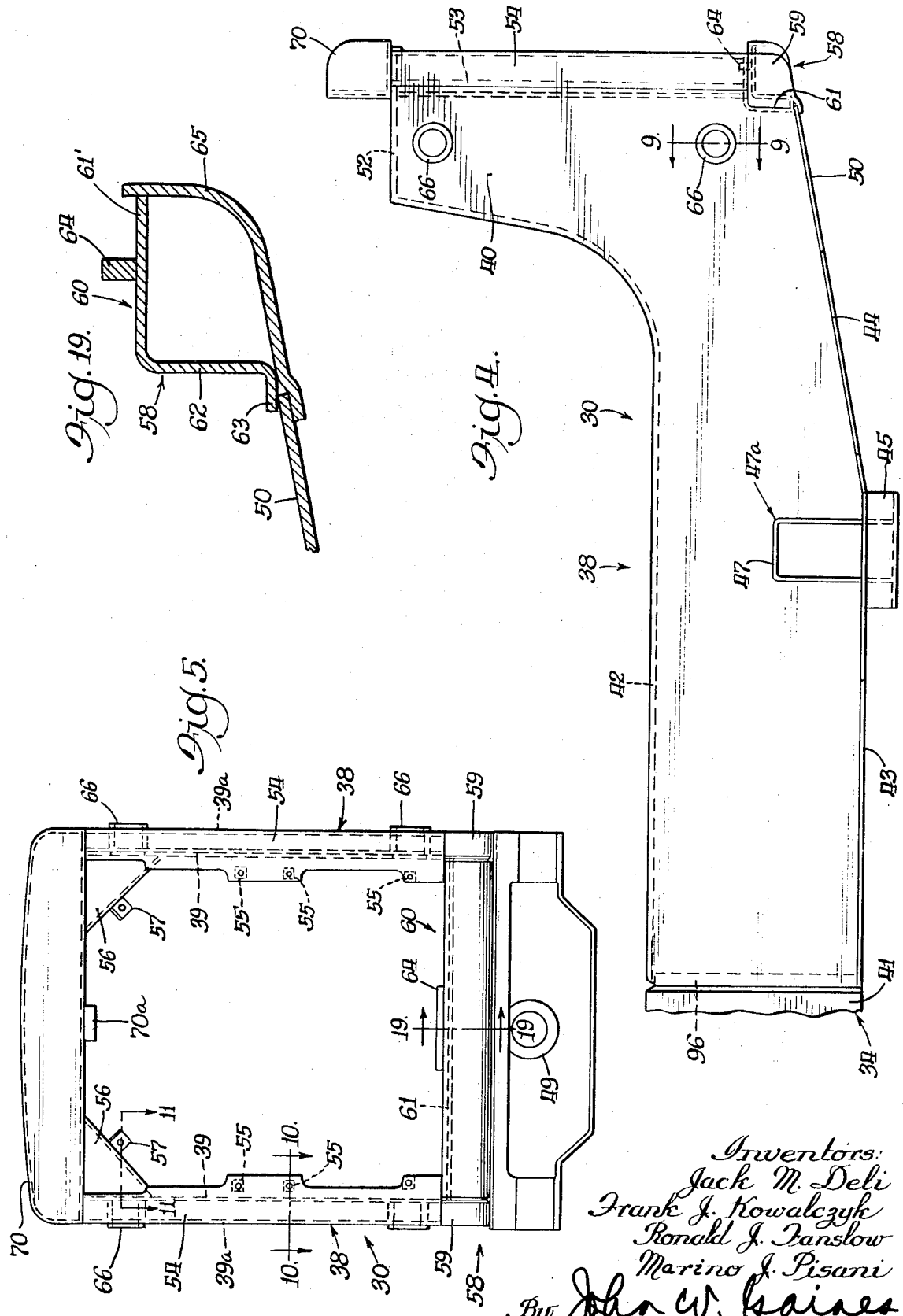

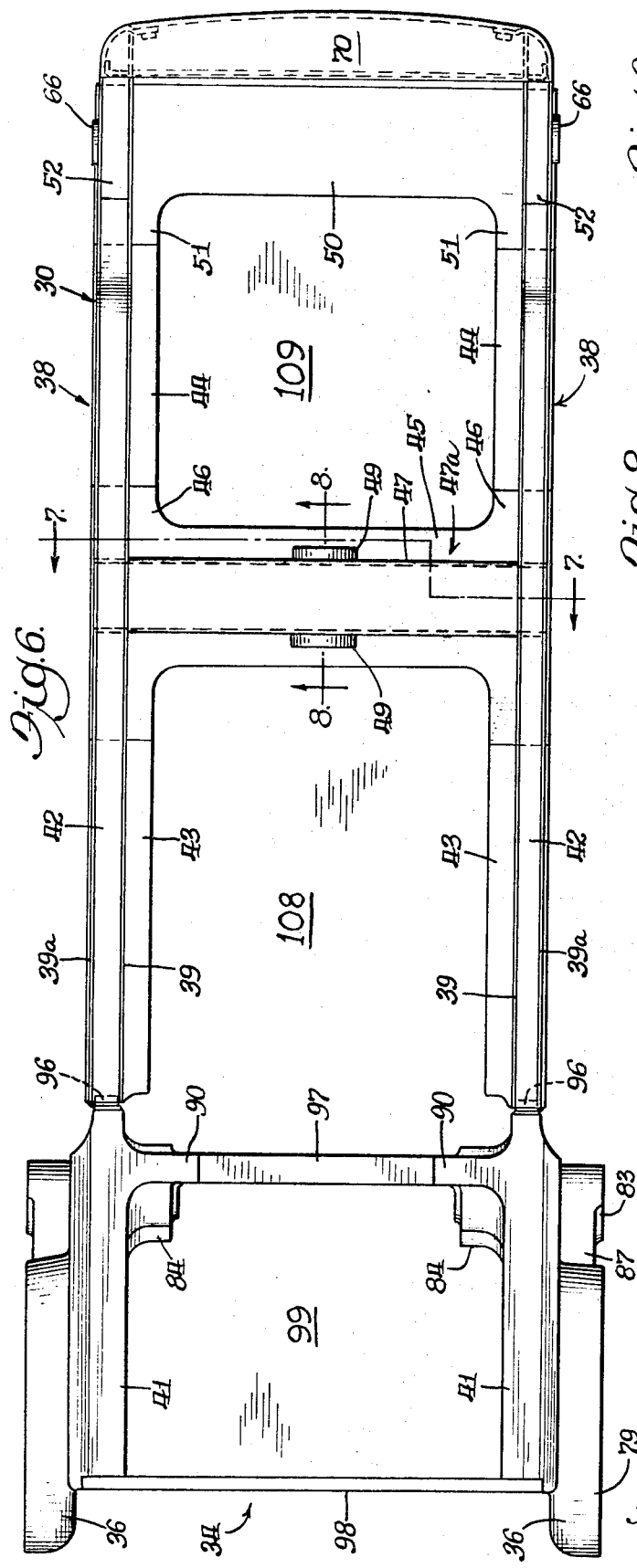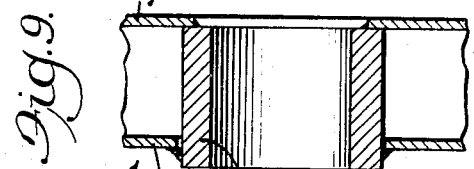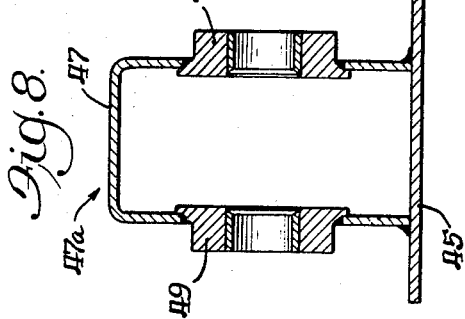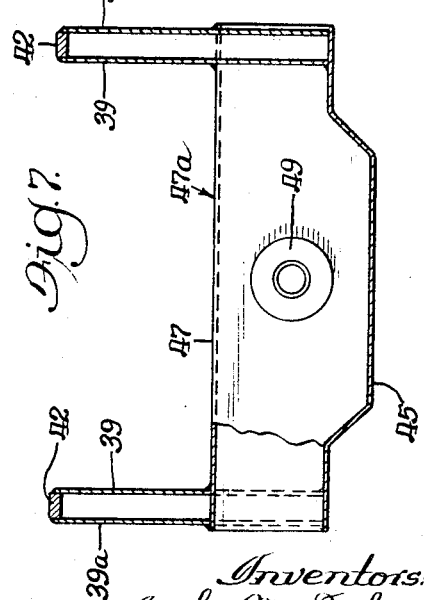

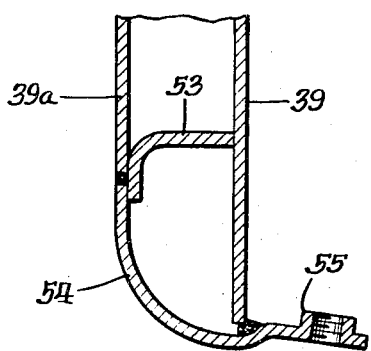
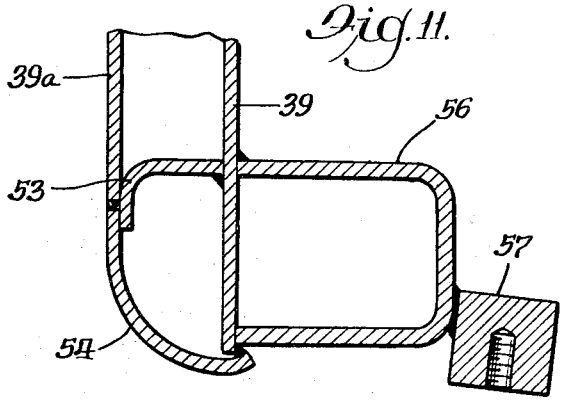
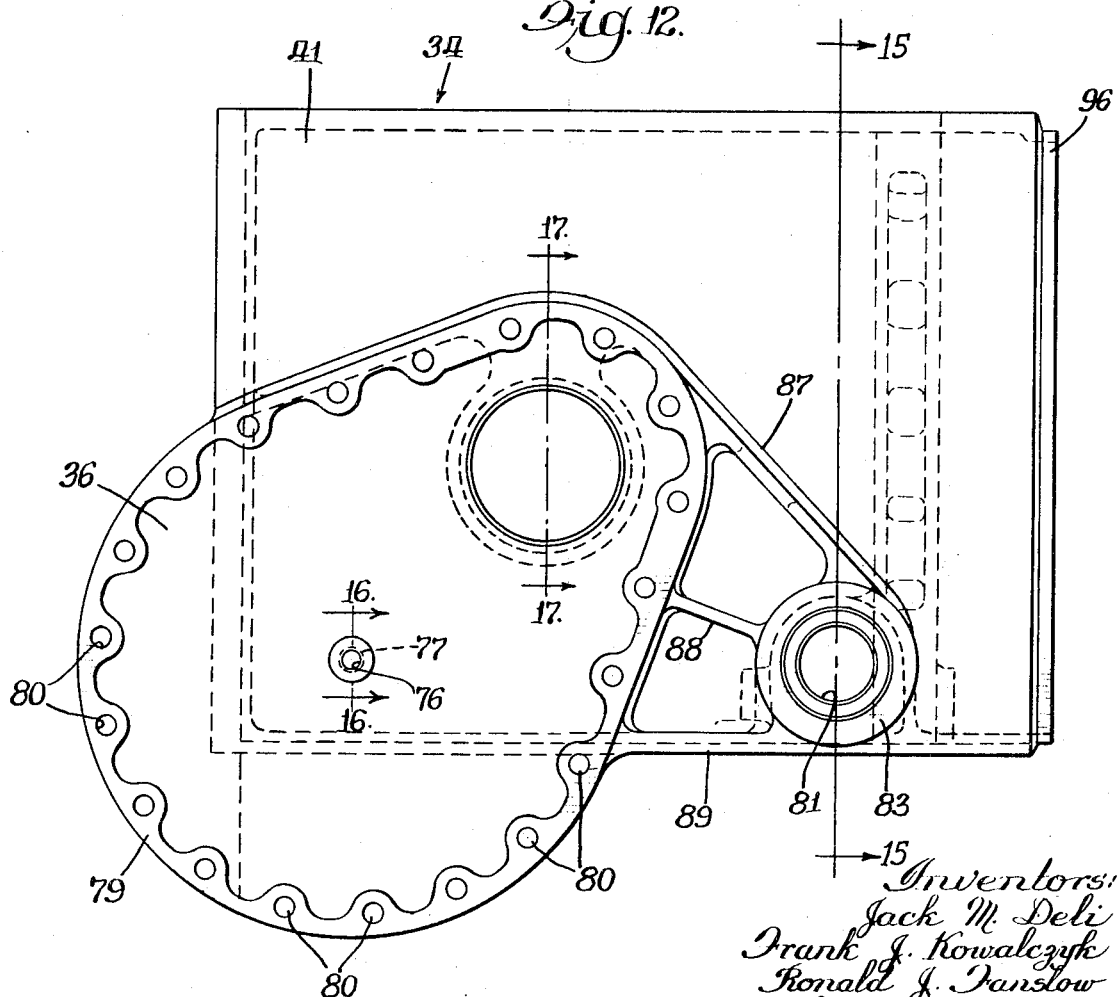

Inventors:
Jack M. Deli
Frank J. Kowalczyk
Ronald J. Fanslow
Marino J. Pisani
By John W. Isaias
Atty.

3,645,350

1

FRAME WITH DOUBLE WALLS FOR CRAWLER TRACTOR

The present invention relates to a unitary chassis frame for a tractor. More specifically, the invention relates to a tractor frame of hollow double-wall construction suitable for a crawler tractor.

It is desirable in a tractor frame, particularly one to be used with crawlers, to make the frame as unitary as possible, for otherwise the many component parts of a tractor frame may be heavy and take up a great deal of space, because of the various connections and attachments between the component parts and the special shaping of the parts required for attachment to one another.

From the later-following description, it will be apparent that we provide an improved fabricated frame of elongated construction made unitary by welding, for a tractor adapted to be equipped with a front engine, a rear steering drive, and an intervening transmission interconnecting engine and drive. More specifically, we provide an integrated chassis frame comprising: sturdy crossmembers adjacent the extreme front and rear of the frame; continuous sides of deep beam construction extending the full length of the frame from front to rear and rigid with the adjacent crossmembers, and each arranged with double walls and arranged generally in a fore and extending vertical plane; the frame having division means dividing same into engine, drive, and transmission compartments for respectively receiving the tractor engine, steering drive, and transmission components between the continuous sides; and top and bottom strips extending substantially the full length of each continuous side, the top strips spacing apart and being joined to the tops of the vertical double walls of the sides and the bottom strips spacing apart and being joined to the bottoms of said vertical double walls; the continuous sides including upright double-wall prolongations at the front of the continuous sides, generally coplanar to and integral with and extending upwardly from, lower double walls of the respective sides, so as to cooperate with adjacent front crossmembers to form a radiator guard door for the engine component.

In the drawings:

FIG. 2 is an exploded perspective view of the frame, a radiator, an engine, and a transmission separated from the tractor frame;

FIG. 4 is an elevational view of the front section of the tractor frame;

FIG. 5 is an end view of the front section of the frame;

FIG. 6 is a plan view of the entire tractor frame;

FIG. 7 is a vertical transverse sectional view taken on the line 7—7 of FIG. 6 and showing connection of the sides of the front section of the frame by an equalizer channel;

FIG. 8 is a vertical longitudinal sectional view taken on the line 8—8 of FIG. 6 and showing inserts in the equalizer channel for pivotally mounting the equalizer bar;

FIG. 9 is a vertical transverse sectional view taken on the line 9—9 of FIG. 4 and showing a tubular piece secured to and between the sheets of a side of the front section of the tractor frame and adapted for mounting the tractor radiator;

FIG. 10 is a horizontal sectional view taken on line 10—10 of FIG. 5 and showing how the front ends of the sheets are secured to one another;

FIG. 11 is a horizontal sectional view taken on the line 11—11 of FIG. 5 and showing the attachment of a bracket to a side sheet;

FIG. 12 is an elevational view of a casting forming one side of the rear section of the tractor frame;

2

Figure 16:
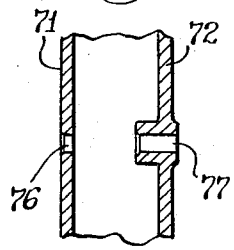
Figure 15:
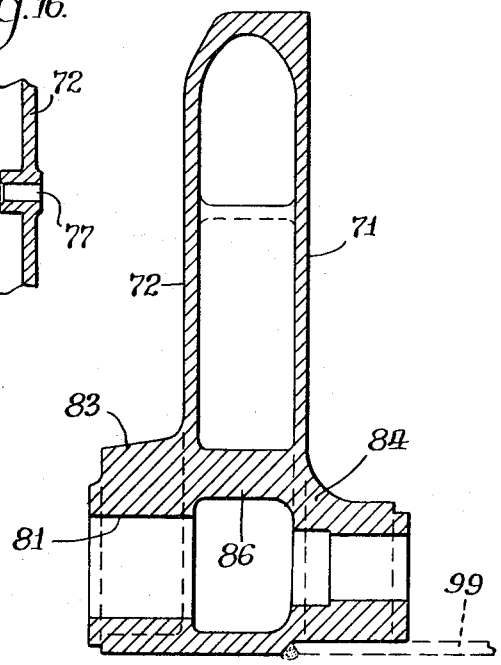
Figure 14:
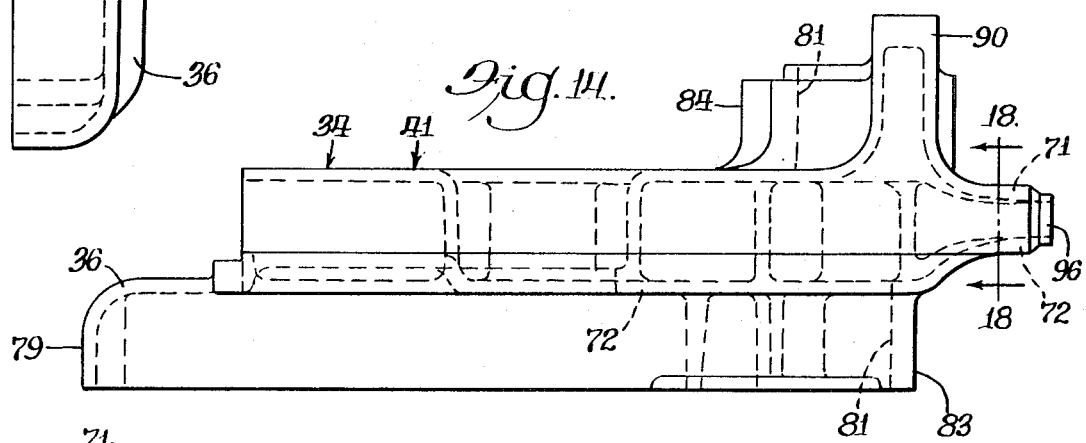
FIG. 14 is a top view of the casting.
Figure 18:
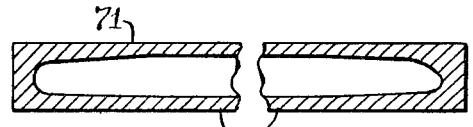
Figure 17:
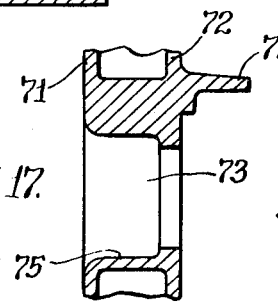

FIG. 15 is a vertical transverse sectional view taken on the line 15—15 of FIG. 12 and showing the spaced-wall construction of the casting and an opening therein for mounting a shaft on which a side frame of the tractor is pivoted;

FIG. 16 is a vertical transverse sectional view taken on the line 16—16 of FIG. 12 and showing lubricating openings formed in the casting;

FIG. 17 is a vertical transverse sectional view taken on the line 17—17 of FIG. 12 and showing the opening in the casting for an output shaft of a final-drive mechanism;

FIG. 18 is a vertical transverse sectional view taken on the line 18—18 of FIG. 14 and showing a reduced end on the casting adapting it to be attached to the sheets of the front section of the tractor frame; and FIG. 19 is a vertical transverse sectional view taken on the line 19—19 of FIG. 5 and showing details of lower front end of the tractor frame.

Figure 1:
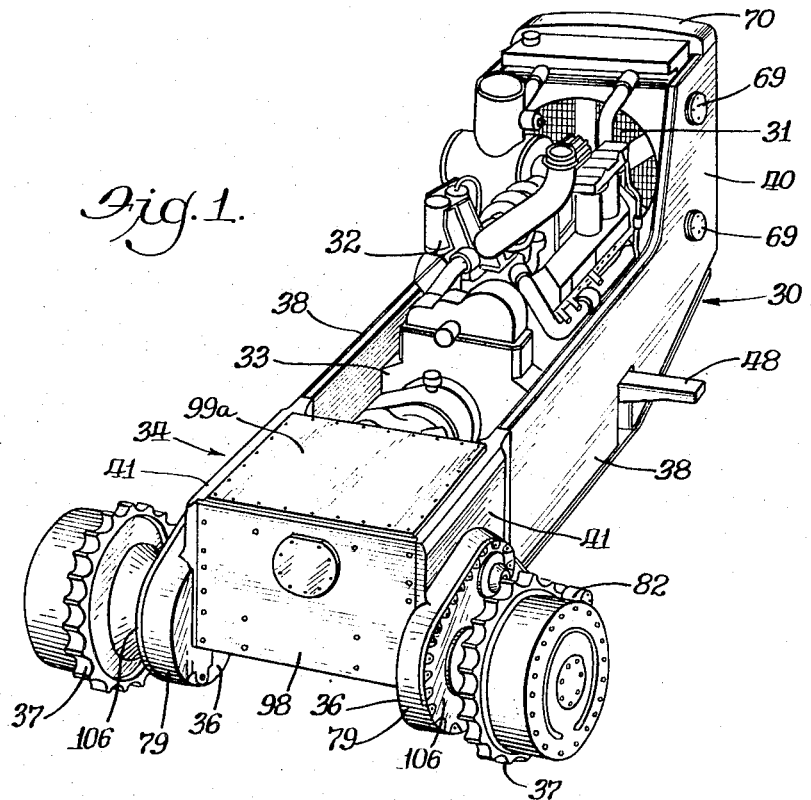
FIG. 1 is a perspective view of the novel frame of the present invention and the various parts of the tractor directly associated therewith.
Figure 3:
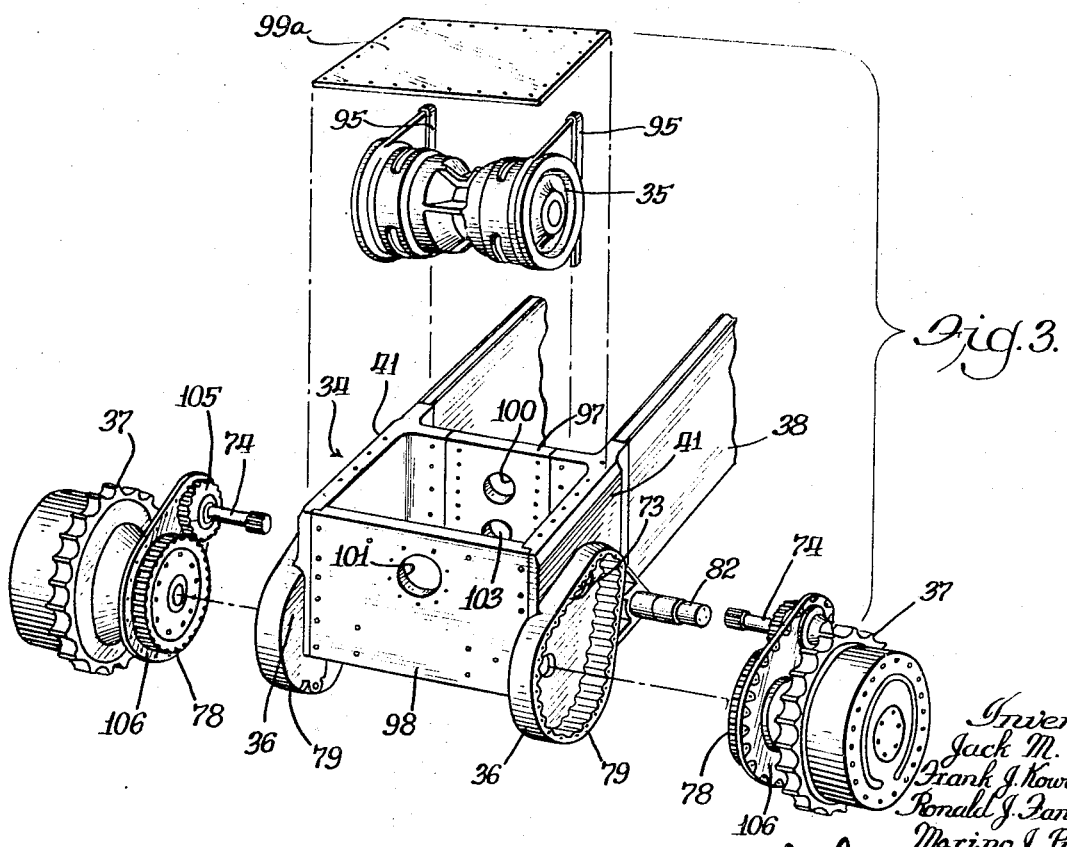
FIG. 3 is a fragmentary exploded perspective view of a portion of the tractor frame and various parts including a steering drive mechanism, a cover, and assemblies of sprocket and driving connections therefor, all separated from the tractor frame.

As shown in FIGS. 1, 2, and 3, the tractor frame of the present invention comprises a front section 30, in which a radiator 31, an engine 32, and a transmission 33 are located, and a rear section 34, in which a steering drive mechanism 35 is located, and at so-called elephant ears 36 of which there are located driving connections between the steering drive mechanism 35 and driving sprockets 37 located outside the rear section 34 for driving loops of tractor links. The front section 30 of the tractor frame has two sides 38, each of which is formed of an inner sheet 39 and an outer sheet 39a, which are spaced from and parallel to one another. Each of sheets 39 and 39a has an upwardly extending front portion 40 serving to mount and guard the radiator 31, as will presently become apparent.

The rear section 34 is the steering drive box in the tractor frame and has two sides 41 each of which is formed of a hollow-wall casting with which the elephant ear 36 is integrally formed. Each of the sides 41 of the rear section 34 is integrally of the tractor frame is secured to one of the sides 38 of the front section 30 in a connection involving insertion between the sheets 39 and 39a and welding, as will presently be disclosed.

As shown in FIGS. 4 to 7, the sheets 39 and 39a of each side 38 of the front section 30 are secured in spaced relation to one another by means of a top strip 42 and two bottom strips 43 and 44. The top strip 42 is inserted between the side sheets 39 and 39a and welded thereto, as shown in FIG. 7. The bottom strips 43 and 44 are welded to and engage the bottom edges of the side sheets 39 and 39a and have portions extending beyond the inner one of the two side sheets 39 toward the other side 38, which portions cooperate with means (not shown) to aid in supporting and attaching the engine 32 and the transmission 33. The bottom strips 43 and 44 are spaced from one another longitudinally of the tractor, and between the bottom strips is located a transverse piece 45 which extends between and connects the two sides 38 of the front section 30. The transverse piece 45 has enlarged end portions 46, each of which extends between the bottom strips 43 and 44 and at one side 38 and is welded to the bottom edges of the sheets 39 and 39a of the sides 38. As shown in FIG. 7, an inverted channel 47 extends transversely of the front section 30 of the tractor frame to openings in the sheets 39 and 39a of each side 38 and is welded to the sheets. The transverse piece 45 and the channel 47 constitute a tunnel 47a for an equalizer bar 48, which is shown in FIGS. 1 and 2, and whose purpose is to interconnect track frames (not shown) at the sides of the tractor. As shown in FIG. 8, the sides of the channel 47 carry inserts 49 adapted to pivotally mount the equalizer 48 at a midregion thereof so as to be free to rock up and down at the bar ends.

As shown in FIGS. 5, 6, and 7, a transverse plate 50 is provided at the forward regions of the side plates 38 opposite the upwardly extending front portions 40 thereof. Enlarged end portions 51 on the transverse plate 50 are welded to the lower edges of the side plates 39 and 39a. Beyond the top strips 42 at the ends thereof at the upwardly extending portions 40 of the side sheets 39 and 39a, short top strips 52 are provided which are secured between and welded to the tops of the upwardly extending portions 40. As shown in FIGS. 6, 10, and 11, the inner sheet 39 of each side 38 extends farther forward than the outer sheet 39a. In each side 38, a vertical angle member 53 is provided which is welded to the front vertical edge of the outer sheet 39a and to a region of the inner sheet 39 somewhat back of its front edge for securing the sheets to one another in spaced relation. A vertical curved corner piece 54 is provided which is welded to the front edge of the outer sheet 39a at its juncture with the angle piece 53 and also to the front edge of the inner sheet 39. As shown in FIGS. 5 and 10, the corner piece 54 inwardly of the inner side sheet 39 carries thickened portions 55 provided with threaded openings for the attachment by screws (not shown) of a radiator guard (not shown). As shown in FIG. 11, there is provided at the inner sheet 39 of each side 38 a triangular bracket 56 of channel section. Each bracket 56 is secured by welding to the associated inner sheet 39 at the upper end of the front edge of the sheet and carries a nut 57 for the attachment of the radiator guard.

As shown in FIGS. 4, 5 and 19, there is provided a transverse bottom member 58 which may be a casting and has enlarged ends 59 and an intermediate portion 60 connecting the ends. The ends 59 of the bottom member 58 engage the sides 38 in recesses 61 formed in the side sheets 39 and 39a at the bottom regions of their front ends, and is secured to the sides 38 as by welding. As shown in FIG. 19, the intermediate portion 60 of the transverse member 58 is composed of a horizontal leg 61, a vertical leg 62 extending therefrom, and a short horizontal flange 63 extending from the vertical leg. The horizontal leg 61 carries a projection 64 whose purpose will be described presently. The flange 63 engages the top of the forward edge of the transverse plate 50. A cover 65 is secured to the lower side of the transverse piece 50 at its forward edge and projects forwardly and upwardly from the transverse plate 50 to a region just above the free edge or flange of the horizontal leg 61' of the main central portion 60 of the transverse bottom member 58.

As shown in FIGS. 4 and 9, vertically spaced short tubular pieces 66 are provided at each side 38 at the portions 40 of the sheets 39 and 39a. Each piece 66 abuts the inner sheet 39 about an opening therein, extends through the outer sheet 39a, and is welded to both sheets so as to secure them to one another in spaced relation. As shown in FIG. 2, for one side of radiator 31, two vertically spaced openings 67 are provided in each of two side pieces 68 of the radiator. The openings 67 have the same spacing as the tubular pieces 66. The radiator 31 is supported in position between the upwardly extending front portions 40 of the sheets 39 and 39a of the sides 38 of the front section 30 by means of inserts of which only the enlarged outer ends 69 are visible in FIG. 1. The inserts applied to the tubular pieces 66 and the openings 67 are secured in place therein by screws passing through the enlarged ends 69 on the inserts and threaded into the ends of the two tubular pieces 66 located just beyond the outer side sheets 39a.

As shown in FIGS. 1, 2, 4, and 5, a hollow structure 70 is provided which extends across the tops of the upwardly extending forward portions 40 of the sheets 39 so as to bridge the sides 38 at the front edges thereof. The hollow structure 70 is secured as by welding to the top strips 52 of the sides 38 and to the bracket 56. When as shown in FIG. 1, the radiator 31 is in position between the front portions 40 of the side sheets 39, the hollow structure 70 is directly forward of the top of the radiator. The hollow structure 70 spaces the forward portions 40 of the sides 38 from one another and cooperates with these forward portions in acting as a guard to the radiator 31. A depending projection 70a on the hollow structure 70 (shown in FIG. 5) and the upstanding projection 64 on the bottom member are adapted to engage the upper and lower edges of the radiator guard door (not shown) at the sides thereof facing away from the radiator 31 and facing toward it, respectively, when the guard is attached by screws to the nuts 57 and the thickened portions 55 on the corner pieces 54.

As previously mentioned, the rear section 34 of the tractor frame has two sides 41. Reference is now made to FIGS. 12-17 for a showing of that side 41 which appears at the right as viewed in FIG. 2.

The said side 41 is formed of a 14-and is a hollow structure having inner and outer spaced parallel walls 71 and 72, as shown in FIGS. 14—17. These walls are vertical and extend longitudinally of the tractor. The top and bottom strips, at the respective left end and right end of the walls 71 and 72 as viewed in FIG. 18, are integral with the walls and desirably become flat outside surfaces when the casting is machined off at the top and bottom. The elephant ear 36 is formed integral with the outer wall 72 and extends laterally outwardly therefrom and also rearwardly and downwardly therefrom.

As shown in FIGS. 12 and 17, the side 41 is provided with an opening 73, which is intended to accommodate a shaft 74, which appears in FIG. 3 and is part of a driving connection between the steering drive mechanism 35 and the sprocket 37. The opening 73 is defined by a portion 75 which joins the walls 71 and 72. As shown in FIGS. 12 and 16, the walls 71 and 72 have aligned openings 76 and 77, respectively, adapted to mount a lubricating tube (not shown) for a gear 78, which appears in FIG. 3. As shown in FIG. 12, the elephant ear 36 has a peripheral flange 79 provided with a plurality of threaded recesses 80 whose purpose will be presently described.

At a region outside the elephant ear 36, the side 41 has an opening 81. This opening can best be viewed in FIGS. 12 and 15 and is intended to accommodate a fixed shaft 82 which can be seen in FIG. 3 and is intended to provide a pivotal support for the rear end for a track frame (not shown) of the tractor. The opening 81 is formed in a short tubular extension 83 integral with the outer wall 72, a short tubular extension 84 integral with the inner wall 71, and a portion 86 surrounding the opening and extending between the walls 71 and 72 and forming part of the base of the side 41. As shown in FIG. 12, the side 41 has ribs 87, 88, and 89 which are formed integral with the outer wall 72 and extended between the short tubular extension 83 and the peripheral flange 79 of the elephant ear 36.

Figure 13:
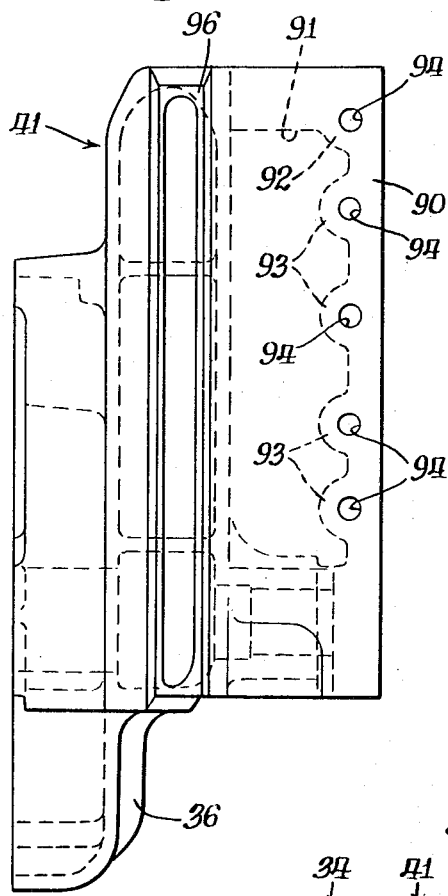
FIG. 13 is an end view of the casting.

As shown in FIGS. 12, 13, and 14, the side 41 has a massive lateral extension 90 which projects for almost the entire vertical dimension of the side 41 and is formed integral with the inner wall 71 and with the short tubular extension 84. The extension 90 has an internal cavity 91 which projects vertically for most of the length of the extension 90 and is connected with the space between the walls 71 and 72 by an opening in the inner wall 71. The extension 90 has a plurality of vertically spaced internal enlargements 93 projecting into the cavity 91 at one side thereof. A plurality of vertically spaced openings 94 are formed in the enlargement 93 and at an upper corner of the extension 90. Bolts or screws (not shown) extend through openings 94 into threaded engagement with brackets 95 of the steering drive mechanism 35, for supporting the same in the rear section 34 of the tractor frame. The steering drive mechanism 35 and its brackets 95 are seen in FIG. 3.

As shown in FIGS. 14 and 18, the forward end of the side 41 is relatively narrow in a horizontal dimension, the walls 71 and 72 being closer together at the forward end than at the regions to the rear of the massive lateral extension 90. The forward end of the side 41 has a reduced terminal portion 96 on which the inner and outer walls 71 and 72 and the portions at the top and bottom joining them are reduced abruptly and appreciably with respect to the corresponding regions just beyond the portion 96. As shown in FIGS. 4 and 6, the reduced terminal portion 96 is inserted in the side 38 of the front section 30 so as to facilitate alignment of the sides 38 and 41 with one another and a welded securement of the sides.

The side 41 of the rear section 34 just described is at the right as viewed in FIG. 3. The side 41 at the left is similar to that on the right, but is symmetrical with respect thereto rather than identical therewith.

As shown in FIGS. 3 and 6, the two sides 41 of the rear section 34 are joined in spaced relation to one another by what we shall refer to as front and rear walls 97 and 98. The front wall 97 is joined by welding with the lateral extensions 90 on the sides 41 in abutting relation. The rear wall 98 is secured to the rear end of the sides 41 by welding. The bottom of the rear section 34 is closed by a bottom plate 99 which, as shown in FIG. 15 for the part of the bottom plate joined to the one side 41, overlaps the bottoms of the sides 41 and is secured thereto by welding. The top of the rear section is closed by a top plate 99a, which appears in FIGS. 1–3.

As shown in FIG. 3, shaft openings 100 and 101 are provided in the front and rear walls 97 and 98, respectively, of the rear section 34 to accommodate a power-takeoff shaft (not shown). The power-takeoff shaft is adapted to be connected with a shaft 102, shown in FIG. 2, extending from the transmission 33 through the rear section 34 of the tractor frame to the rear thereof. A shaft opening 103 in the front wall 97 below the opening 100 accommodates a driving connection between the steering drive mechanism 35 and shaft 104 extending from the transmission 33, which driving connection includes a universal coupling 104a.

When the driving sprockets 37 and associated parts are assembled with respect to the rear section 34 of the tractor frame as shown in FIG. 2, the shafts 74 shown in FIG. 3 project in a manner not shown through the openings 73 formed in the sides 41 within the elephant ears 36 so that the inner ends of the shaft 74 have driving engagement with the steering drive mechanism 35. The outer ends of the shafts 74 have a driving engagement with a pair of pinions 105 each meshing with one of the gears 78. The gears 78 are drivingly connected with the driving sprockets 37 for the loops of tractor links (not shown), preferably by a planetary transmission that may include the following parts (not shown): sun-gear extensions on the gears 78, fixed internal ring gears, planet gears meshing with the ring gears and the extensions of the gears 78, and carriers for the planet gears fixed to the driving sprockets 37. The gears 78 and the pinions 105 meshing therewith are contained in space enclosed by the elephant ears 36 and their flanges 79 and covers 106, which are secured to the flanges 79 by screws (not shown) passing through the covers into threaded engagement with the recesses 80 in the flanges 79.

Guard plates across the bottom of the frame impart a hull-like appearance thereto and, in FIG. 6, they will be seen to comprise the permanently welded bottom plate 99 at the rear, a bolt-on guard door 109 at the front removably secured to attachment flanges there adjacent to complement the strips and plates 44, 45, and 50, and an intermediate guard door 108 bolted to, among other things, attachment flanges there adjacent to complement the strips 43.

What is claimed is:

1. A frame for a crawler tractor, comprising a front section adapted to contain a radiator, an engine, and a transmission, and a rear section adapted to contain a steering drive mechanism, the front section comprising two pairs of two parallel-spaced sheets, one pair of sheets forming one side of the front section, the other pair forming the other side thereof, each of the sheets extending forwardly from the rear section and terminating in upwardly extending front portions adapted to mount the radiator at its sides and to serve as a guard for the radiator, the rear section comprising two sides each of double-wall hollow construction, one side of the rear section being aligned with and secured to the sheets of one side of the front section, the other side of the rear section being similarly associated with the sheets of the other side of the front section, the frame further comprising a first wall secured to and extending between the sides of the rear section adjacent ends thereof secured to the sides of the front section, and a second wall secured to and extending between the sides of the rear section adjacent their ends remote from the sides of the front section.

2. A frame as specified in claim 1, each side of the front section of the frame having two vertically spaced short tubular pieces secured to and extending between the upwardly extending portions of the sheets at openings therein, the tubular pieces spacing said upwardly extending portions from one another and being adapted to receive projections on the sides of the radiator for mounting the same.

3. A frame as specified in claim 2, the front section of the frame further comprising a hollow structure extending between the sides of the front section and secured to the tops of the upwardly extending portions of the sheets of the front section, the hollow structure spacing the sides of the front section from one another at the upwardly extending portions and being adapted to cooperate therewith in guarding the radiator.

4. A frame as specified in claim 1, the front section of the frame further comprising two top strips, one strip spacing and being secured to the upper edges of the sheets of one pair, the other strip being similarly associated with sheets of the other pair.

5. A frame as specified in claim 4, the front section of the frame further comprising four bottom strips, one of the bottom strips spacing and being secured to the lower edges of the sheets of one pair at a rear portion thereof, another of the bottom strips spacing and being secured to the lower edges of the said one pair at a front portion thereof, the remaining two bottom strips being similarly associated with the lower edges of the sheets of the other pair, each of the bottom strips having a flange portion projecting beyond the sheets of the associated pair for a short distance toward the sheets of the other pair, each side of the rear section being formed of a casting and having a reduced end inserted in the space formed by the two sheets, top strip, and bottom strip of the associated side of the front section.

6. A frame as specified in claim 5, the bottom strips associated with the sheets of each pair being spaced from one another longitudinally of the frame, the front section of the frame further comprising a transverse plate extending between the sides of the front section and being secured to the lower edges of the sheets of each pair at the spaces between the bottom strips.

7. A frame as specified in claim 6, the front section of the frame further comprising an inverted channel extending across the front section over the transverse plate and through the sidewalls of each pair and being secured thereto, the channel and transverse plate forming a tunnel for an equalizer bar for the tractor.

8. A frame as specified in claim 7, the front section further comprising inserts applied to a midregion of the sides of the channel and being adapted to pivotally mount the equalizer bar.

9. A frame for a crawler tractor, comprising a front section adapted to contain a radiator, an engine, and a transmission, and a rear section adapted to contain a steering drive mechanism, the front section comprising hollow sides extending forwardly from the rear section and terminating in upwardly extending front portions adapted to mount the radiator, the rear section at the sides comprising two hollow cast structures extending rearwardly from the sides of the front section, each structure comprising two closely spaced-apart parallel walls and a so-called elephant ear gear housing, each cast structure (41) of the rear section of the frame comprising a first shaft opening, and further comprising a second opening adapted to receive a fixed shaft mounting a track frame of the tractor, each structure having at the second opening a short tubular extension integral with the wall with which the elephant ear gear housing is integral, and further having ribs integral with said wall and extending between the tubular extension and the flange of the elephant ear gear housing.

10. A frame as specified in claim 9, the spaced walls (71, 72) of the structure being joined by a portion (75) of the structure defining said first opening.

11. A frame as specified in claim 9, the spaced walls of each structure being joined by a portion defining said second opening.

12. Fabricated frame of elongated construction made unitary by welding, for a tractor adapted to be equipped with a front engine, a rear steering drive and an intervening transmission interconnecting engine and drive, said frame comprising:

sturdy crossmembers adjacent the extreme front and rear of the frame;

continuous sides of deep beam construction extending the full length of the frame from front to rear and rigid with the adjacent crossmembers, and each arranged with double walls and arranged generally in a fore-and-aft extending vertical plane;

said frame having division means dividing same into plural compartments which are for collectively receiving the engine, drive, and transmission components between the continuous sides and at least one of which is at the rear of the frame and is devoted for receiving solely the steering drive component; and top and bottom strips extending substantially the full length of each continuous side, the top strips spacing apart and being joined to the tops of the vertical double walls of the sides, through and including the steering drive component compartment sides at the rear and engine component compartment sides at the front, and the bottom strips spacing apart and being joined to the bottoms of said vertical double walls, through and including the steering drive component compartment sides at the rear and engine component compartment sides at the front.

13. The invention of claim 12, the continuous sides including upright double-wall prolongations at the front of the continuous sides, generally coplanar to and integral with and extending upwardly from, lower double walls of respective sides;

the crossmembers including vertically spaced-apart crossmembers at the extreme front, between the respective tops of the upright double-wall prolongations and bottoms of the lower double walls of the sides, spacing same and cooperating therewith as radiator guard of the engine component.

14. The invention of claim 12, the continuous sides at a corresponding lower section intermediate the ends of each having one of said division means rigid therewith and comprising an inverted channel;

said channel forming a transverse tunnel dividing the frame at the bottom into compartments one for receiving the engine and one for receiving the transmission between the continuous sides;

a track equalizer bar; and means supporting the bar in said tunnel, in isolation from the frame compartments and with freedom to rock up and down at the bar ends about a generally centrally located, fore-and-aft extending pivot axis.

15. The invention of claim 12, comprising:

bottom plate means and bottom attachment flange means;

the frame having a bottom which for a major portion thereof is covered by the just-said means, except for plate openings in the attachment flange means; and guard plates secured across the openings to the attachment flange means, including removably secured guard door plates.

* * * * *